Patented Jan. 7, 1941

2,227,720

UNITED STATES PATENT OFFICE 2,227,720

COATING COMPOSITION

Ernest L. Kallander and Joseph F. Thompson, Framingham, Mass., assignors to Dennison Manufacturing Company, Framingham, Mass., a corporation of Massachusetts No Drawing. Application January 31, 1939, Serial No. 253,732

6 Claims. (Cl. 91—68)

In printing on some surfaces, such as aluminum foil, it is necessary first to treat the foil so that the printing ink will adhere, but the treatments heretofore proposed have had various drawbacks. If the foil be treated with phosphoric acid or the like, enough uncombined acid remains on the surface of the foil to discolor many kinds of inks in the subsequent printing operation. If the foil be coated with shellac or the like, the coating does not adhere well, at least not without aging for a long time. Attempts to combine phosphoric acid or the like with different coating materials have led to difficulties. For example, addition of phosphoric acid to lacquers of the cellulose acetate type causes the acetate to precipitate if enough acid is added to produce the desired effect upon the foil. And, in working on this problem, I have discovered that a coating of ordinary shellac dries too quickly to afford ample time for phosphoric acid, mixed with the shellac, to act on the foil.

Objects of this invention are to provide a treatment for aluminum foil and the like which causes printing ink to adhere satisfactorily, which does not discolor the printing ink, which can be carried out in a single operation, which does not require a thick coating, which does not discolor the foil, which does not add materially to the cost of the printing operation, and which if desired can be carried out rapidly enough to be applied to the foil while the foil is being fed into a printer.

This invention involves the discovery that sufficient phosphoric acid and the like for the aforesaid purpose may be added to shellac and other resinous coating materials without deleterious effect upon such materials and that, by decelerating the drying rate of these coating materials, the phosphoric acid may be afforded sufficient time to act upon the foil before the coating hardens. To retard the drying rate a part or all of the alcohol, ordinarily employed as the solvent, may be replaced with one or more solvents having higher boiling points. Other agents having an effect upon aluminum similar to that of phosphoric acid are sulphuric acid, hydrofluoric acid and ammonium chloride. Examples of other natural and synthetic resinous coating materials comprise dammar, ester gum, copal resin and modified alkyd resin such as amberol.

The resinous material should be wax-free. For most purposes, particularly for very thin coatings the preferred formula is as follows:

| | Pounds |
|---|---|
| Shellac (commercially wax-free) | 60 |
| Denatured alcohol (95%) | 180 |
| Butanol | 80 |
| Butyl acetate | 80 |
| Phosphoric acid (10% of 85% acid in methanol) | 24 |
| Dibutyl phthalate | 3 |

This solution is preferably prepared by first dissolving the shellac in the alcohol after which the butyl acetate and dibutyl phthalate are thoroughly stirred in. The phosphoric acid solution is then added and the mixture is again thoroughly stirred. Following this the solution is transferred to a glass-lined or other non-corrodable, preferably non-metallic, container and allowed to stand for at least five hours, resulting in a slight precipitate of wax. The clear solution is then removed for application to the foil.

While the concentration of shellac is preferably about 14% of the total mixture, the concentration may vary between approximately 5% and 25% and, in some cases, between even wider limits. The amount of phosphoric acid solution of the above formula may also vary between approximately twelve and sixty pounds.

In choosing the resin for a particular application the character of the inks to be applied to the coating, as well as their solvents, should be kept in mind. For example, if the inks have a nitro-cellulose base, the resin should be one which is not readily attacked by the solvents for nitrocellulose; otherwise there is danger of dissolving or lifting parts of the resinous coating in the subsequent application of the ink.

The solvent should be such as to afford ample time for the etching agent to act upon the foil before the coating has hardened sufficiently to inhibit the action of the etching agent. Ordinarily the time required is at least of the order of from one to two seconds and preferably about five or six seconds. To this end the solvent should have a medium boiling point (100° C. to 150° C.) or should comprise a mixture which affords a similar drying rate. So long as the drying rate is maintained within the aforesaid limits the solvents and their ratios one to another may be varied widely; and, when the foil is not to be printed immediately or for any other reason more time is available for drying, the drying rate may be further reduced as by choosing a solvent having a still higher boiling point. The addition of a plasticizer, such as dibutyl phthalate, improves the adhesion of the ink, particularly in the presence of water.

Phosphoric acid is preferable to the aforesaid substitutes because it is entirely free from discoloration difficulties and it does not penetrate deep enough to weaken the foil substantially. This acid reacts with aluminum to form an aluminum acid phosphate which is not easy to dissolve and which adheres strongly both to the aluminum and to the resinous coating.

The preferred method of applying the coating to foil is to pass the foil between an upper rubber-covered roll and a lower chromium-plated roll which dips into the coating solution, in which case the paper backing, if the foil has a paper backing, should of course be uppermost. In the case of gravure printing the coating may be applied in the press by using the first unit of the press to apply the coating instead of printing. By regulating the pressure between the rolls the coating may be applied as thinly as desired, down to a coating so thin that when dried it appears multicolored due to refraction interference when viewed at an angle. The adhesion between foil and coating may be made even stronger by mechanically scrubbing the foil, preferably with the coating solution, just before coating. This may be accomplished conveniently by causing the foil to rub over a pad of felt, saturated with the solution, as the foil approaches the coating roll. The action of the acid on the foil is preferably accelerated by preheating the foil to about 105° F.

Unlike pyroxylin lacquers the resin of my improved coating material not only prevents the phosphoric acid from discoloring the printing inks but, when it hardens in drying, it traps the acid which has not reacted with the foil during the drying operation and inhibits further action, thereby automatically regulating the degree of etching in accordance with the rate of drying.

It should be understood that the present disclosure is for the purpose of illustration only and that this invention includes all modifications and equivalents which fall within the scope of the appended claims.

We claim:

1. The method of preparing aluminum foil to receive printing ink which comprises applying to the foil a coating to which printing will adhere essentially consisting of an etching agent resinous material which when dry, traps the agent from the foil and ink and a solvent which when the coating is spread in a thin film dries out in approximately 2 to 6 seconds, whereby aluminum foil may be quickly prepared to receive printing so that the ink adheres firmly and the agent remaining in the dry coating is substantially inhibited from further action on either the foil or the ink.

2. The method of preparing aluminum foil to receive printing ink which comprises applying to the foil a coating to which printing will adhere essentially consisting of phosphoric acid, resinous material which, when dry, traps the acid from the foil and ink and a solvent which when the coating is spread in a thin film dries out in approximately 2 to 6 seconds, whereby aluminum foil may be quickly prepared to receive printing so that the ink adheres firmly and the acid remaining in the dry coating is substantially inhibited from further action on either the foil or the ink.

3. The method of preparing aluminum foil to receive printing ink which comprises applying to the foil a coating to which printing will adhere essentially consisting of an etching agent, shellac which, when dry, traps the agent from the foil and ink and a solvent which when the coating is spread in a thin film dries out in approximately 2 to 6 seconds, whereby aluminum foil may be quickly prepared to receive printing so that the ink adheres firmly and the agent remaining in the dry coating is substantially inhibited from further action on either the foil or the ink.

4. The method of preparing aluminum foil to receive printing ink which comprises applying to the foil a coating to which printing will adhere essentially consisting of phosphoric acid, shellac which, when dry, traps the acid from the foil and ink and a solvent which when the coating is spread in a thin film dries out in approximately 2 to 6 seconds, whereby aluminum foil may be quickly prepared to receive printing so that the ink adheres firmly and the acid remaining in the dry coating is substantially inhibited from further action on either the foil or the ink.

5. The method of preparing aluminum foil to receive printing ink which comprises applying to the foil a coating to which printing will adhere essentially consisting of an etching agent resinous material which when dry, traps the agent from the foil and ink and a solvent boiling between substantially 100° and 150° C. and which when the coating is spread in a thin film dries out in approximately 2 to 6 seconds, whereby aluminum foil may be quickly prepared to receive printing so that the ink adheres firmly and the agent remaining in the dry coating is substantially inhibited from further action on either the foil or the ink.

6. The method of preparing aluminum foil to receive printing ink which comprises applying to the foil a coating to which printing will adhere consisting of an etching agent, a plasticizer, resinous material which, when dry, traps the agent from the foil and ink and a solvent which when the coating is spread in a thin film dries out in approximately 2 to 6 seconds, whereby aluminum foil may be quickly prepared to receive printing so that the ink adheres firmly and the agent remaining in the dry coating is substantially inhibited from further action on either the foil or the ink.

ERNEST L. KALLANDER.
JOSEPH F. THOMPSON.